United States Patent [19]

Mueller et al.

[11] Patent Number: 4,819,118
[45] Date of Patent: Apr. 4, 1989

[54] ELECTROMAGNETIC CONTACTOR TANDEM CONTROL SYSTEM FOR THERMAL PROTECTION OF A BIDIRECTIONAL MOTOR DRIVE

[75] Inventors: Denis A. Mueller, Asheville, N.C.; Gary F. Saletta, Penn Township, Westmoreland County, Pa.

[73] Assignee: Westinghouse Electric Corp., Pittsburgh, Pa.

[21] Appl. No.: 201,237

[22] Filed: Jun. 2, 1988

[51] Int. Cl.$^4$ .............................................. H02H 5/04
[52] U.S. Cl. ...................................... 361/25; 361/103; 364/483; 340/825.06
[58] Field of Search ....................... 361/23, 24, 25, 28, 361/93, 94, 95, 99, 103; 340/825.06; 364/483

[56] References Cited

U.S. PATENT DOCUMENTS

| | | | |
|---|---|---|---|
| 3,735,219 | 5/1973 | Kohn et al. | 361/25 X |
| 4,034,269 | 7/1977 | Wilkinson | 361/79 |
| 4,038,695 | 7/1977 | DePuy | 361/96 |
| 4,219,860 | 8/1980 | DePuy | 361/94 |
| 4,319,298 | 3/1982 | Davis | 361/24 |
| 4,423,458 | 12/1983 | Stich | 361/93 |
| 4,423,459 | 12/1983 | Stich | 361/94 |
| 4,525,763 | 6/1985 | Hardy | 361/27 |
| 4,544,982 | 10/1985 | Boothman et al. | 361/103 X |
| 4,547,826 | 6/1985 | Premeriani | 361/23 |
| 4,550,360 | 6/1985 | Dougherty | 361/93 |
| 4,589,052 | 5/1986 | Dougherty | |
| 4,658,323 | 4/1987 | Dougherty | 361/79 |
| 4,682,264 | 7/1987 | Demeyer | 361/96 |
| 4,717,984 | 1/1988 | Henry et al. | 361/103 X |

FOREIGN PATENT DOCUMENTS 2081995 2/1982 United Kingdom ................. 361/25

OTHER PUBLICATIONS

Instructions for A210, A250, Size 3 or 4 Reversing Motor Controller (I. L. 15466B Model J, Westinghouse Electric Corporation Control Division, Asheville, N.C. 28813, United States of America 4-1984.

Primary Examiner—Derek S. Jennings
Attorney, Agent, or Firm—C. N. Lorin

[57] ABSTRACT

A bidirectional motor has two electromagnetic contactors, one for forward, the other for reverse operation. Thermal protection is provided by a thermal image generator and a thermal protection unit in each contactor operating in tandem via a bidirectional line of communication keeping the thermal images in parallelism by one active contactor "talking" to the inactive contactor, the "listener".

7 Claims, 12 Drawing Sheets

ELECTROMAGNETIC CONTACTOR TANDEM CONTROL SYSTEM FOR THERMAL PROTECTION OF A BIDIRECTIONAL MOTOR DRIVE

CROSS REFERENCE TO RELATED PATENT APPLICATIONS

The invention is related to the subject matters of the following patent applications:

Application Ser. No. 016,420 filed Feb. 19, 1987 for "Electromagnetic Contactor With Lightweight Wide Range Current Transducer With Sintered Powdered Metal Core" by J. C. Engel;

Application Ser. No. 016,421 filed Feb. 19, 1987 for "Electromagnetic Contactor With Wide Range Overload Current Relay Board Utilizing Left Shifting And Method" by G. F. Saletta et al.;

Application Ser. No. 016,419 filed Feb. 19, 1987 for "Electromagnetic Contactor With Control Circuit For Providing Acceleration, Coast And Grab Functions" by J. A. Bauer;

BACKGROUND OF THE INVENTION

1. Field of the Invention

The invention relates to protection by electromagnetic contactors in general, and more particularly to the use of contactors for the protection of a bidirectional motor.

2. Description of the Prior Art

Electromagnetic contactors are well known. See for instance U.S. Pat. No. 3,339,161 issued Aug. 29, 1967 to J. P. Conner et al. entitled "Electromagnetic Contactor". As opposed to a plain circuit breaker, such as an AC line switchbreaker, a contactor may effect circuit breaking and reclosing operations many times and in close succession, in accordance with several functions such as starting, coasting, switching, overload or overcurrent detection and timed switching. To perform those various functions, a protection control unit is associated with the contactor and, in its more modern form, is built as a solid state circuit.

With a bidirectional motor it is known to combine two such contactors connected and used for establishing alternating motor operation modes, one in the forward direction, the other in the reverse direction, each contactor sharing a common protection control unit.

The main object of the present invention is to use two contactors, each with a separate protection control unit, to provide protection of a bidirectional motor against overheating.

It is known to associate with one contactor a control function performing the determination of the thermal image of the load, i.e. of a motor. See for instance: U.S. Pat. Nos. 4,525,763; 4,547,826; 4,423,458 and 4,423,459. The thermal image is represented by an accumulation of $I^2$, where $I^2$ is the square of the current passing through the motor. Whenever a reference value has been exceeded, the contactor is triggered to trip and the AC supply to the motor is disconnected.

The protection control unit can determine, for a motor operating continuously in the same mode, whether to cause the associated contactor to trip if the thermal image reveals a critical stage. With two contactors operating separately for a single bidirectional motor, the problem exists to be able to treat both protection control units as a single unit when determining at any given time whether the thermal image of the heat accumulated in the common motor requires an overall tripping. The present invention aims at solving this problem.

SUMMARY OF THE INVENTION

The present invention resides in combining with a bidirectional motor two electromagnetic contactors connected with the motor, one for the forward mode the other for the reverse mode, each contactor having its own protection control unit and each protection control unit performing a thermal image function, with a bidirectional line of communication therebetween providing both talking and listening functions throughout motor operation, the two contactors being tripped whenever the thermal image exceeds a critical level.

"Talking and listening" is achieved with a microcomputer within each protection control unit and at each end of the line of communication, whether the contactor be operative under a given motor mode of operation, or not.

In each contactor, the thermal image limit function feature is included with other features of the associated protection control unit. This feature is performed at minimum cost and without disturbing protection control unit integration within the contactor. At the same time, the trip control units are miniaturized as solid state units, each housed within its associated electromagnetic contactor.

BRIEF DESCRIPTION OF THE DRAWINGS

FIG. 13 shows register contents and messages in 4-bit and 8-bit formats as used when performing the controlling steps involved in the operation of the circuit of FIG. 10;

DESCRIPTION OF THE PREFERRED EMBODIMENT OF THE INVENTION

Figure 1:
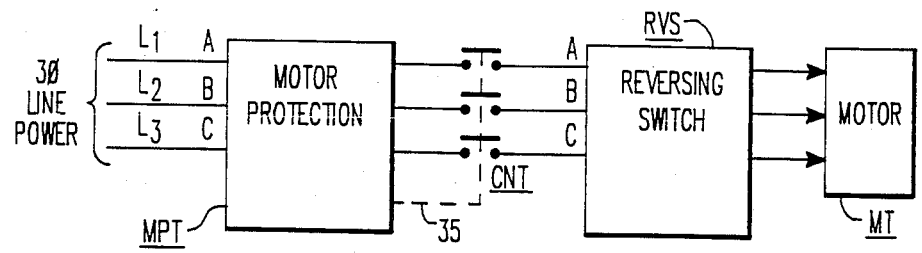
FIG. 1 is a prior art block diagram illustrating bidirectional motor thermal protection with a single electromagnetic contactor.

FIG. 1 shows a prior art motor reversing scheme consisting of a bidirectional motor MT supplied with AC power via three phases A, B, C of AC power lines L1, L2, L3 and through a reversing switch RVS controlled for alternatively reversing the phase order, assuming opposite directions of rotation, alternatively. A single contactor CNT is provided for motor protection under control of a motor protection control circuit MPT effecting contact opening when tripped by line 35.

Figure 2:
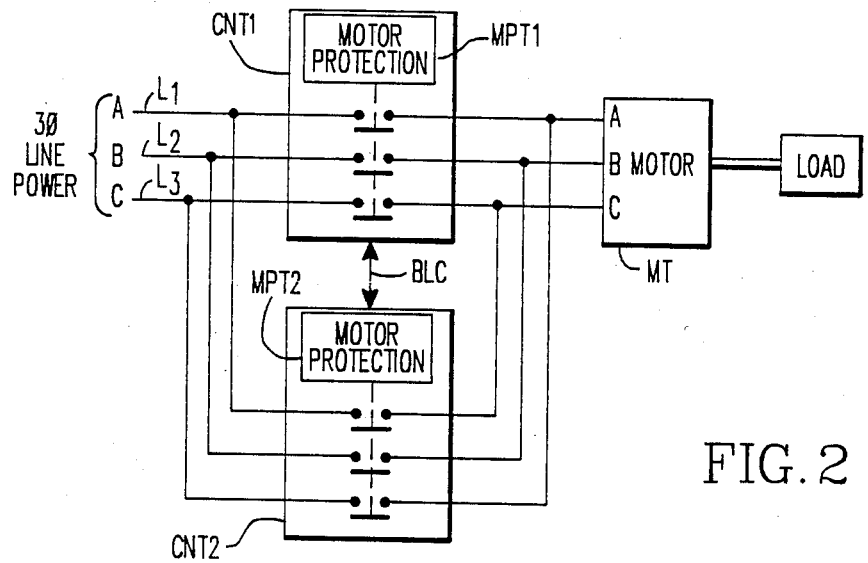
FIG. 2 is a block diagram of a system providing bidirectional motor thermal protection according to the present invention, through the use of two electromagnetic contactors operating in tandem to develop a thermal image of the motor, memory of the thermal state being kept on each side while remaining in constant intercommunication so as to provide for concurrent tripping of the corresponding contactors at a critical stage.

In contrast, as shown in FIG. 2, according to the present invention two contactors CNT1 and CNT2 are provided, each affected to one direction of motor rotation. Electromagnetic contactor CNT1 passes lines L1, L2, L3 to the motor MT in the direct order of the phases A, B, C, whereas contactor CNT2 provides a reverse sequence at its output. Each contactor has its own trip control unit, MPT1 and MPT2, respectively. The two protection control units are connected by a bidirectional line of communication BLC, as explained hereinafter.

Figure 3:
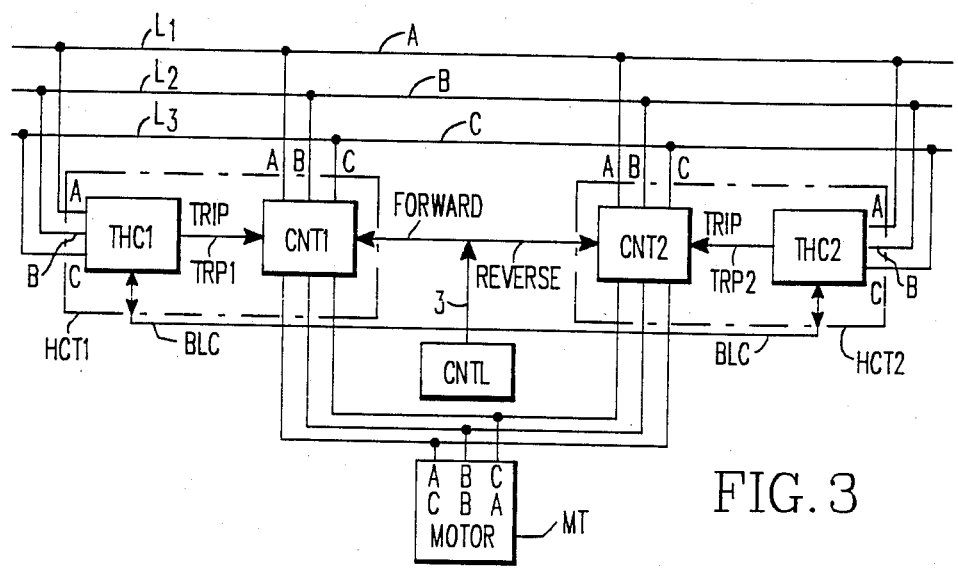
FIG. 3 is a block diagram illustrating the circuit organization of the thermal protection system of FIG. 2.

FIG. 3 shows in block diagram the two contactors CNT1 and CNT2 passing phase line currents onto the motor MT one in the direct phase order (ABC), the other in the reverse phase order (CBA). Each contactor has its own protection control unit, THC1 and THC2, respectively. The latter are sensing directly the phase line current and perform internally under monitoring and control of an adjunct microcomputer the tripping function which, upon the occurrence of a critical condition, will (via line TRP1, or TRP2) deenergize the coil of the associated contactor (CNT1, or CNT2). A general control circuit (CNTL) is provided which may be manually operated by an operator to START the motor by closing one contactor or the other, to operate the motor in the forward or the reverse mode, or to STOP the motor by opening both contactors. FIG. 3 also shows, as in FIG. 2, a bidirectional line of communication BLC between the two protection control units THC1 and THC2.

As explained in the afore-stated two first cross-referenced patent applications, current sensing is centered on the combination of a current transducer, an A/D converter and a register which operate under control of a microcomputer. It is known therefrom to provide a tripping scheme in response to an overload, which is standard, less costly, reliable and safe. Such scheme, in particular, allows the essential protective functions to be embodied in a compact housing, and integrated as a solid state circuit within the contactor which does the switching. The functions are derived, performed, monitored and controlled with the help of an embedded microcomputer.

First, this calls for a current transducer coupled to the AC lines to be monitored for possible overcurrent. This current transducer generates the derivative of the sensed current, which is the primary current, but at a much reduced scale and phase shifted by 90 degrees. Accordingly, without betraying the sensed magnitude except for the scale, nor the timing thereof, a sensed value is derived after which integration is digitized by a standard analog-to-digital converter. As explained in the afore-mentioned patent applications, the transducer is specially designed for miniaturization. The transducer output is integrated over successive half-cycles of the negative polarity, then, converted into digital form. If it is desirable to use a standard and less costly 8-bit A/D converter, there is a practical limitation in the 8-bit capability of the A/D converter at its output, while it responds to an analog input varying only up to, say, 5 volts. This would limit the range of current magnitudes which may be digitized. An elegant solution to this problem has been described in the stated cross-referenced patent applications. It is based on the observation that, with any digital number, doubling its value amounts to shifting it by one bit position toward the most significant side, namely to the left. Accordingly, A/D conversions are effected only when the number of negative half-cycles of accumulated sampling are twice the number of negative half-cycles accumulated for the last A/D conversion. Therefore, each A/D conversion is twice the value of the preceding conversion. All conversions to digital numbers are stored from the A/D converter output into an additional register having an 12-bit capacity. Whenever a given conversion reveals that half of the maximum value of the 8-bit A/D converter is exceeded, the system will cease to sample anymore sensed AC current but, rather, based upon the conversion already derived, will double by a one-bit position left shift the digital number stored in the 12-bit register. This will occur further with the occurrence of twice the number of the preceding negative half-cycles recorded being pursued until the end of the time interval chosen for sampling. The range capability of the system will have been extended from a maximum defined by 8 bits in the A/D convertor, to the maximum defined by 12 bits in the additional register. This will appear from a summary description of FIGS. 4 to 9 according to the afore-stated cross-referenced patent applications. For this purpose, the two first cross-referenced patent applications are hereby incorporated by reference.

Figure 4:
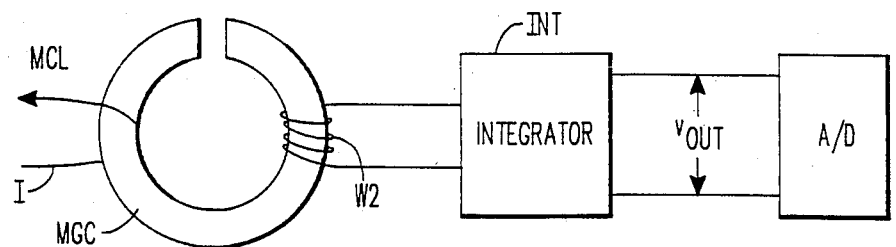
FIG. 4 is a block diagram of a basic and illustrative circuit involved in each protection control unit consisting of a microcomputer, and A/D converter and current transducers as used for developing a digital representation of the AC line currents, such as described in the two first cross-referenced patent applications.
Figure 5A:
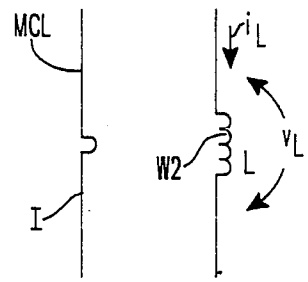
FIGS. 5A and 5B illustrates the relationship between the AC line current flowing in the motor and in the primary of the current transducer, and it graphically shows the output of the transducer which is proportional to the derivative thereof.
Figure 5B:
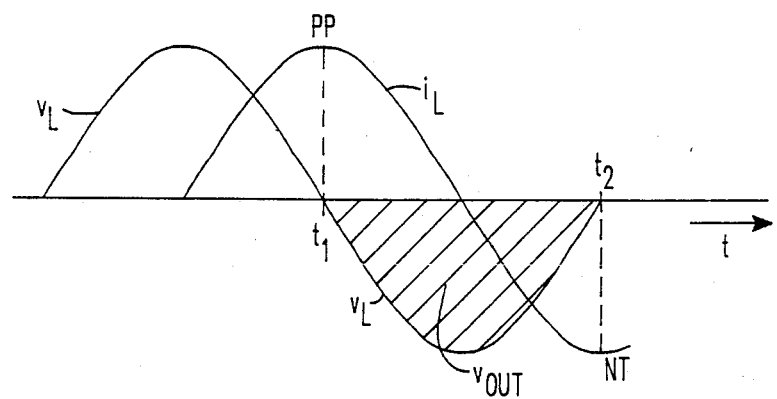

Referring to FIGS. 4, 5A and 5B, there is shown in FIG. 4 a toroidal current transducer traversed by the AC line MCL, the AC current of which is to be sensed at the secondary winding W2 coupled through a magnetic core MGC to the main line MCL. If, as shown in FIG. 5A, $v_L$ is the voltage developed across the secondary W2 when a current $i_L$ derived inductively passes therethrough, the known relation $v_L = L \times di_L dt$ applies. From there, it follows that $di_L = (1/L)v_L \times dt$. The integration of the quantity so derived will yield the current I flowing in the AC line at the primary. Referring to FIG. 5B, it is observed that, at the secondary of the transducer, the derivative cosine wave given by $v_L$ is similar to the sine wave applied at the primary of the transducer, but with a phase shift of 90 degrees (the scale being ignored). If integration of $v_L$ is effected over a half-cycle, the voltage obtained will keep the same polarity therethrough, while the term $\int(1/L)v_L \times dt$ will reach its maximum value at the end of such half-cycle. From FIG. 5B it appears that during the integration of $v_L$ the current $i_L$ will have passed from its maximum positive to its maximum negative, when sampling of $v_L$ has been conducted during the negative polarity thereof. Current $i_L$ on the scale of $v_L$ in FIG. 5B, corresponds to the line current I divided by the turn ratio, and $i_L$ peak corresponds to I peak.

Figure 6:
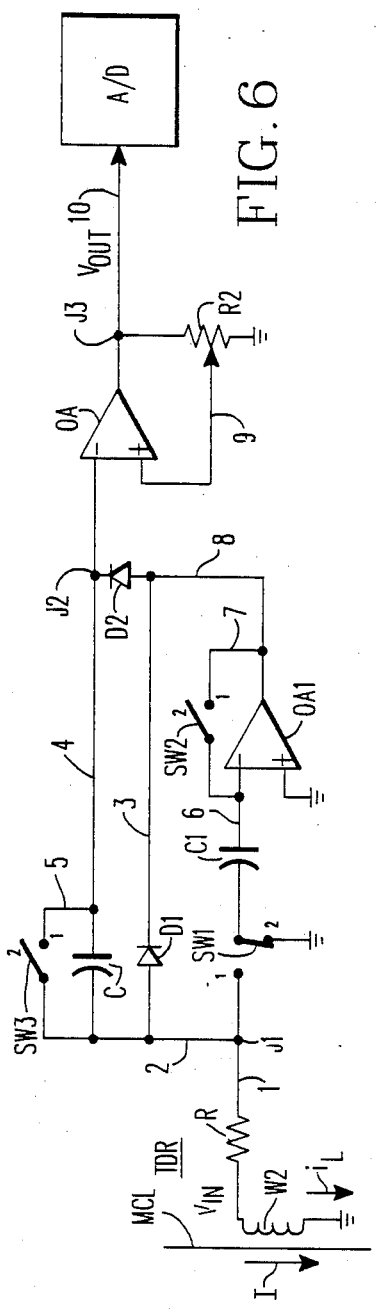
FIG. 6 is a circuit illustrating the combination of the integrator and of the A/D converter of FIG. 4 as controlled by a microcomputer when performing successive current sampling operations.

The circuitry of FIG. 6 is used with the microcomputer, first to provide the integration with a time constant RC (R is the resistor and C is the capacitor values) of the inputted derivative voltage $v_L$ from the current transducer of FIG. 4, and, secondly to provide, with the A/D conversion, a digital representation of the output voltage $v_{out}$. FIG. 6 shows an integrator INT having its input voltage $v_{in}$ derived from the output of the current transducer TDR and its output $v_{out}$ applied to the input of an A/D converter. A/D conversion generates a digital representation of the output voltage $v_{out}$, whereas the output voltage $v_{out}$ is derived from $v_{in}$ in accordance with the formula:

$$v_{out} = (-1/RC) \int_{t_1}^{t_2} v_{in} \times dt$$

The operation of the A/D converter is as follows:
The main line MCL induces in the secondary winding W2 of transducer TDR a voltage $v_L = Ldi_L/dt$ which is applied via a resistor R by lines 1 and 2 at one side of a capacitor C, assuming switch SW1 is in position #1, and switches SW2 and SW3 are in their open positions. Therefore, with a time constant RC, capacitor C is charged and at junction J2 appears a voltage at the input of a buffer amplifier OA. The output of OA at junction J3 is the voltage $v_{out}$ applied on line 10 to the A/D converter.

Figure 7:
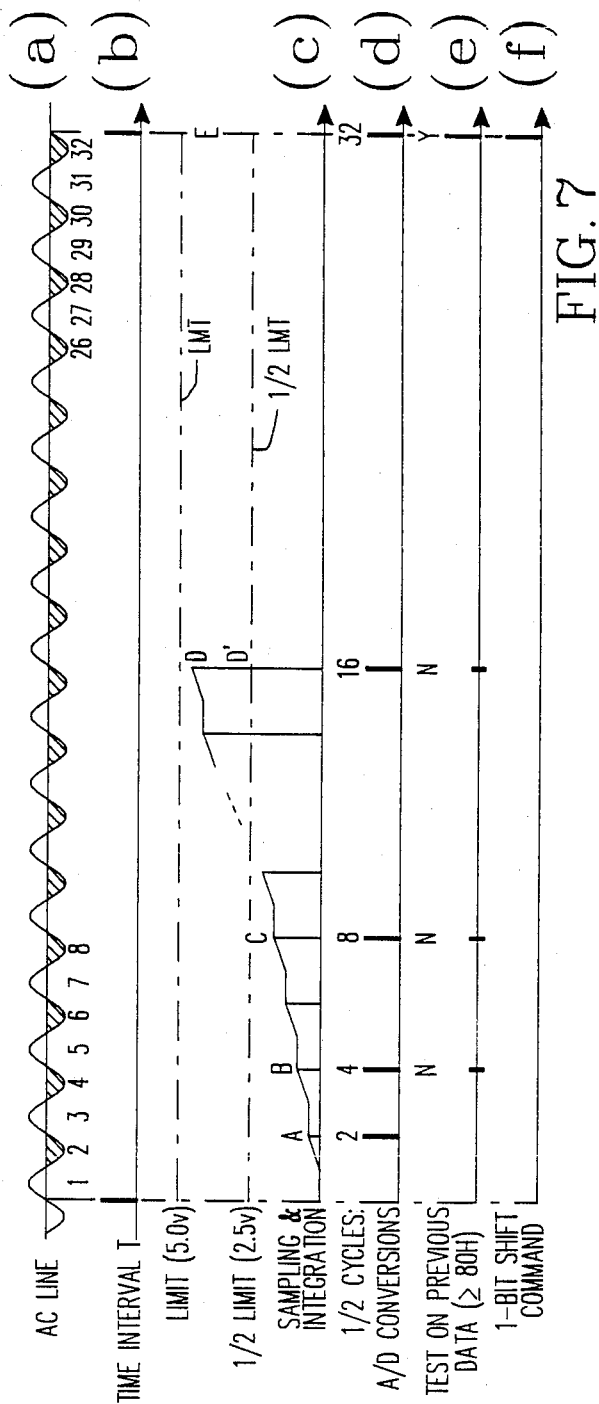
FIG. 7 is a graphic representation of the sampling process achieved under a geometric progression of factor 2.

Referring to FIG. 7, the operation of the circuit of FIG. 6 is performed during a time interval T corresponding to 32 half-cycles of the line voltage. As a result, the output voltage $v_{out}$ across resistor R2 is increasing by steps. The range on junction J3 is, typically, from 0 volt to 5 volts. The digital equivalent is a binary number ranging from all ZEROS to all ONES on the register DR. Switch SW1 is switched to position #2 and switches SW2, and SW3 are switched to their closed positions, as required in order to reset the circuitry at the end of each 32 half-cycle interval T. When switch SW1 is in its position #2, and switch is closed, capacitor C1 builds up a charge balancing any offset inherent in operational amplifier OA1. Therefore, when switch SW3 is opened and switch SW1 goes to position #1 (and switch SW2 is opened), capacitor C of the integrator INT will charge up under the influence of input voltage $v_{in}$. $v_{out}$ appears on line 10 at the output of operational amplifier OA and at the input of the A/D converter for conversion thereafter. The successive negative half-cycles of voltage applied to capacitor C through resistor R, are integrated and translated into a digital number at the output of the A/D converter, in accordance with a geometric progression as a function of time of factor 2. Thus, the output voltage $v_{out}$ is equivalent to the integral of $v_L$ totalized over 1, 2, 4, 8 and 16 negative half-cycles. It is understood, however, that the magnitude of $v_L$ during the time interval T may be small, average, large, or very large, depending upon the magnitude of the AC line current I in line MCL.

As explained in the two first cross-referenced patent applications, the A/D converter being limited by both the input voltage (up to 5 volts, typically) and maximum count (8-bit, typically), an additional register of wider bit definition is provided responding to the A/D count so as to extend the overall capability to reading larger numbers, thereby to extend the range of AC line currents that can be handled by the particular A/D converter.

Referring to FIG. 7, under (a) is shown $v_L$, the derivative of the current sensed by current transducer TDR. On the waveform have been shaded the negative half-cycles involved in the determination of the peak AC line current. A time interval T is used, typically shown encompassing 1, 2, 4, 8 and 16 negative half-cycles in accordance with the afore-stated geometric progression as a function of time of factor 2. The time interval is shown under (b). The microcomputer resets the integrator INT and, upon a new time interval T from the zero-crossing, counts through the accumulated representation of the AC line current so derived. Under (c) is shown the accumulation of the integrated negative half-cycles. The total is increasing during each negative half-cycle in the presence of a limit LMT (typically 5.0 v) and half of such limit (2.5 v). A/D conversions are conducted, as shown under (d), for ½cycles designated 2, 4, 8, 16 and 32, respectively. As illustrated under (e), upon the occurrence of the half-cycles ranked as 2, 4, 8, 16 all within the afore-stated sampling time interval T, a test is effected upon the previous A/D conversion to the effect of determining whether it was equal, or larger, than the half of limit LMT (80H in this instance) shown under (c). In the example given, at time A, the previous A/D conversion result was smaller than 80H (the half-limit value). Likewise at times B, C, and D, the previous A/D conversions were smaller than 80H. These results are indicated as a NO (logic N) under (e). However, at time E (32 half-cycles), the test states that the previous conversion at D exceeded 80H. Therefore, as shown under (e), the logic conclusion of the test is YES (logic Y). Accordingly, as shown under (f), a command is generated by the microcomputer to shift the digital result obtained at time D to the left by one-bit position. Consequently, each sampled portion of the voltage $v_L$ derived from the transducer and appearing on line 1 (FIG. 6) is integrated by charging up capacitor C in the integrator. The A/D converter, typically, accepts a range on line 10, which is the input for A/D conversion, ranging from ZERO to 5 volts. This is translated digitally with a 8-bit counter, at the output, as a binary range between "0000 0000" and "1111 1111", or between 0 and 255 in decimal form. Should, however, the magnitude of the AC line current become so large as to cause the accumulated value to exceed the 5 volts limit of line 10, the A/D converter will no longer provide a reliable count. Under (c) is shown the maximum A/D capability as a limit LMT. For the purpose of illustration, it has been assumed with the example of FIG. 7 that, for sample D (corresponding to 8 negative half-cycles being accumulated), the accumulated voltage on line 10 exceeds the afore-stated limit ½ LMT. As explained in the cross-referenced patent applications, a test is conducted upon each previous sampling in order to determine whether the accumulated value on line 10 is greater, or equal, to the half-value (80H) of limit LMT. If it is so, the next value on sampling will be equal to the maximum LMT, or exceed it. This is the case, illustratively for Time E (a pulse under (e) indicates a positive test, and the computer will react accordingly). In such case, as shown under (f), a command is generated no longer to digitize the accumulated voltage of line 10 (which would be an unreliable count anyhow) but, instead, to shift the digital number last digitized by the A/D converter by one bit position toward the most significant bits, namely to the left.

Figure 8:
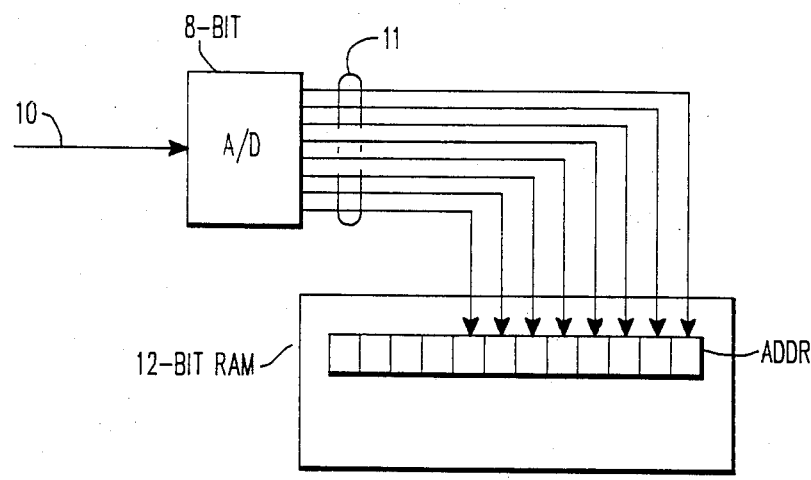
FIG. 8 illustrates digital circuitry associated with the operative steps illustrated in FIG. 7, whereby an 8-bit A/D converter is combined with a 12-bit shift register to increase the current range capability.

Referring to FIG. 8, this is achieved with a register, in the form of a RAM location defined by an address ADDR, of 12-bit capacity. The last number counted by the A/D converter is transferred and stored via the eight lines 11 into the first 8 bits of the RAM. Upon a one-bit position shift command following the threshold positive test, such last count (at Time E in FIG. 7) is shifted by one-bit position to the left. This is known to double the value of the shifted number. Since the register would accept three more such shifts, the range is extended from "0000 1111 1111" to "1111 1111 0000", which provides a digital range from 0 to 4080. This improvement is obtained with standard and low cost equipment. One-bit position shift command will be generated upon each of the remaining anticipated samplings. In the example of FIG. 7 there is only one left (at half-cycle 32).

Figure 9:
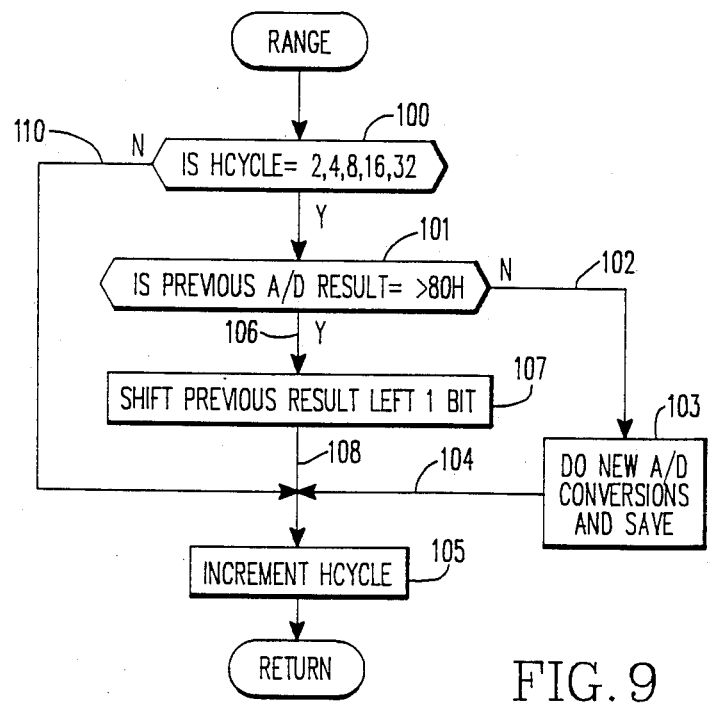
FIG. 9 is a flow chart illustrating how the microcomputer performs the sampling functions and the bit-position shifts associated with the circuit of FIG. 8 and the graph of FIG. 7.

FIG. 9 is a flow chart explaining the operation of the microcomputer in performing the steps required by FIGS. 7 and 8. Within the time interval T, chosen to extend from 0 to 32 half-cycles, the system is set (at 100) to identify the completion of 2, 4, 8, 16 and 32 half-cycles. Upon each term of the afore-stated geometric progression of factor 2, the system performs a test (at 101) by comparing the previous result against the threshold value of ½ LMT, namely 80H. Based, upon that test, the system: either performs (upon a NO on 102) a new A/D conversion which is to be saved, or, assuming the threshold has been exceeded (a YES on line 106) meaning that the capability of the A/D converter would prevent further samplings to be converted and saved, it merely retains the previous A/D conversion data as they have been registered in the additional 12-bit RAM (FIG. 8), and it shifts them there (at 107) to the left (i.e. toward the most significant bit), thereby accomplishing a multiplication by 2 of such registered data. As a result, the additional register (shown as a RAM in FIG. 8) provides a digital representation of the AC line current for a range of 16 times as great as the one an 8-bit A/D converter alone could provide. Indeed, the operation just described for one time interval T, is repeated for successive such time intervals, after resetting and counting again the terms of the geometric progression from the first zero-crossing following such a reset (increments of HCYCLE at 105).

Figure 10:
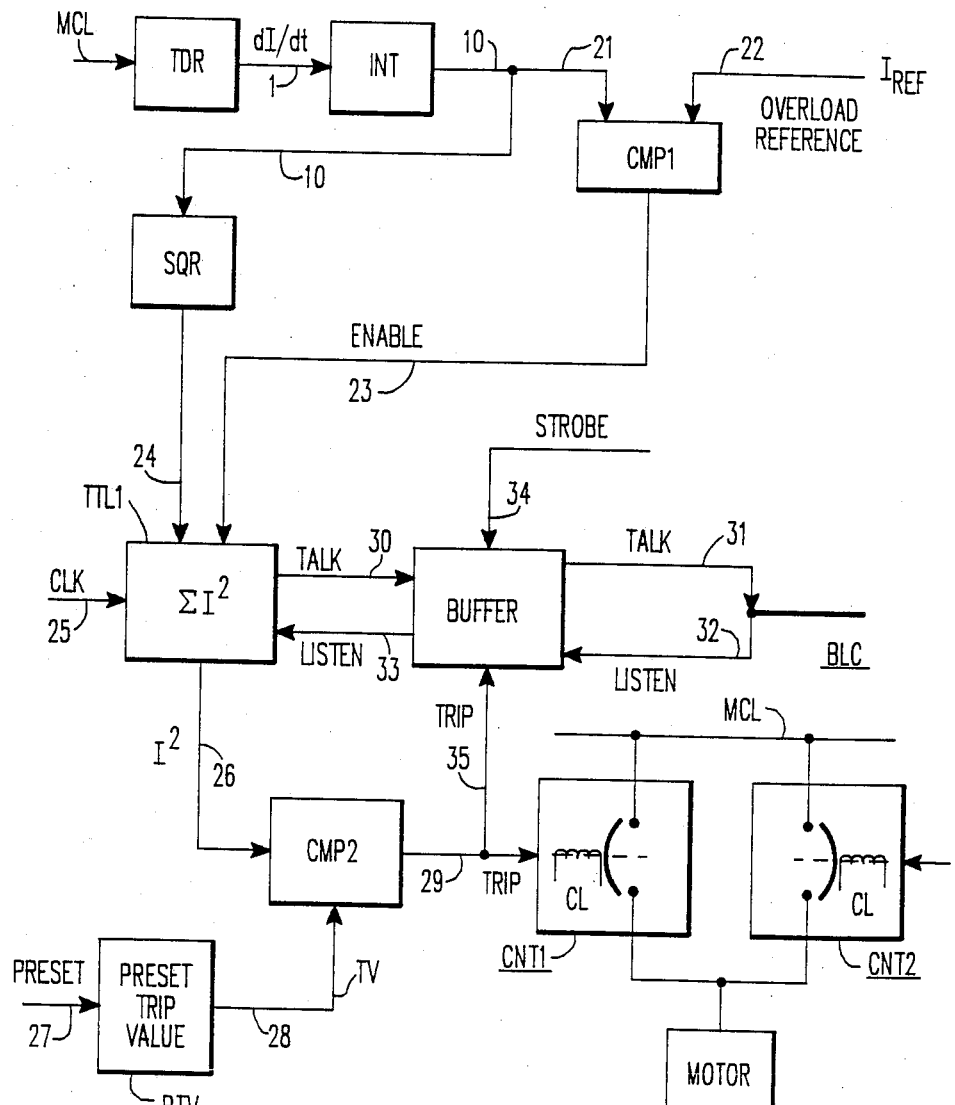
FIG. 10 is a block diagram illustrating the operation of the thermal image function and triggering of a tripping command within the protection control unit of one contactor, while performing bidirectional communication with the other contactor in accordance with the present invention.

FIG. 10 is a block diagram illustrating the thermal function generator present within the protection control unit of contactor CNT1. It uses the line current peak value as sensed in accordance with FIGS. 4, 6, and 7. For the sake of clarity, the circuit is shown without the A/D conversion, digital treatment representation is minimized and the microcomputer monitoring the operation is not shown. The AC line current I of line MCL is converted by transducer TDR into its derivative dI/dt appearing on line 1. Then, the signal is integrated at INT to provide on line 10 a signal representing the value of I. The signal of line 10 is inputted into a squaring circuit SQR generating the value of $I^2$ at its output, on line 24. From line 10 is derived line 21 carrying the value of I as an input to a comparator CMP1 further responsive to a reference signal, on line 22, representing an overload reference current $I_{REF}$ (hereinafter called IPU for per-unit) established by the user.

Assuming contactor CNT1 is the active contactor and the motor is moving, for instance in the forward mode, line 24 at the output of the squaring circuit SQR goes to a tally circuit TTL1 performing, upon each time interval T, the summation of the incoming sampled value $I^2$ received from input line 24, and of the previous samples, thus, accumulating $I^2$ as a function of time and as clocked by line 25. Tally circuit TTL1, however, is operative only when enabled by line 23 to initiate and proceed with the tally, namely, if the signal of line 21 has exceeded within comparator CMP1 the threshold imposed by line 22. The running tally within TTL1 is in turn inputted into another comparator CMP2 having a threshold value TV imposed from line 28 as a preset trip value (register PTV) which has been set on line 27 by the user. Should the output of line 26 reach the critical level TV imposed by line 28, comparator CMP2 issues by line 29 a trip command to the coil control unit of contactor CNT1, thereby deenergizing the electromagnetic coil CL, whereby the contacts become open and the AC supply to the motor through contactor CNT1 is disconnected from its supply line MCL. As a result, damage to the motor is prevented, and the motor is able to cool off. It is observed that the quantity totalized by tally circuit TTL1, subject to the magnitude of the current exceeding an acceptable limit set by line 22, is a measure of the thermal energy applied to the motor in overload. This is a fair indication of the temperature state of the motor. The system proceeds with the tally circuit TTL1 to a totalizing of the energy applied to the motor until a critical amount TV is exceeded. Until then, the thermal image can be maintained without the risk of damaging the motor. The limit is preset by the user on line 28. Tripping occurs automatically when the reference of line 28 has been exceeded. When this occurs, by line 35, a buffer circuit BFF1 is made aware of this fact and such information is passed, by line 31 and the line of communication BLC, to another buffer circuit BFF2 (not shown) used for a treatment similar to buffer BFF1, but in relation to contactor CNT2. It is observed that the magnitude of the current needs not remain the same. It might go lower, and the amount totalized on line 26 would take more time to reach a critical level. It is also possible that comparator CMP1 may periodically disable circuit TTL1, by line 23. In other words, there is a constant monitoring of the situation, so that upon a critical level on line 23, the system be ready to trip contactor CNT1 by line 29, should the total of line 26 exceeds the threshold of line 28. Typically, the tally effected by tally circuit TTL1 is related to a tally trip value for which, if exceeded, the trip command to the coil control unit will be triggered, whereas a ½ tally trip value is established which the system will tend to follow as long as the IREF value is not exceeded. This is done by allowing the tally to be decreased toward the ½ tally trip value, characterizing a cooling-off period of the motor, and conversely to increase toward such ½ tally trip value characterizing a warming-up period of the motor under normal operation.

Thermal protection by tripping as shown with TTL1 for contactor CNT1 in FIG. 10, exists also for contactor CNT2, although not shown. Owing to the choice of miniaturized parts and elements (made possible by the nature and quality of the current transducer TDR, the A/D converter and the microcomputer with its added register) the overall system (the thermal image included) will be reduced to a solid state assembly which can be mounted on, or housed within, the very contactor which it is supposed to monitor and control. In this regard, while overload and overcurrent protection have been described with an AC supply schematized by a single AC line MCL, it is understood that protection is in fact provided for a three-phase AC line system. This has been clearly described in the cross-referenced patent applications. The current I peak value is determined by the same circuit for each of the phase lines (A, B and C) and the resulting digital current signals are monitored, the common contactor being tripped if necessary, for the three lines serving the load.

Motor thermal protection is accomplished with two contactors CNT1 and CNT2, as shown in FIG. 10. Accordingly, the tally obtained by circuit TTL1 for contactor CNT1 is passed by line 30 to the buffer BFF1 which operates, upon a command on line 34, to store the present value derived from the TTL1 circuit. The snapshot of the $I^2$ tally so derived is, then, sent by line 31 over the bidirectional line of communication BLC onto an identical buffer (BFF2 not shown) associated with a corresponding tally circuit (TTL2 not shown) pertaining to the protection control circuit of contactor CNT2. This is what occurs when contactor CNT1 is active, i.e. when it is closed. It will be said, hereinafter, that in this case contactor CNT1 "talks" with contactor CNT2. If the situation is reversed, it is contactor CNT2 which in response to its own tally circuit (TTL2 not shown) and via its own buffer (BFF2 not shown) "talks" with contactor CNT1. Then, as seen for contactor CNT1, it will be said that, when contactor CNT2 is active, contactor CNT1 is inactive and "listens". "Listening" by contactor CNT1 occurs also via BCL and by line 32 to buffer BFF1 and line 33 to tally circuit TTL1.

It is understood that the microcomputer does all the monitoring, determines the sampling steps and effectuates all the comparisons based on digital signals and numbers, such as derived from the additional 12-bit register of FIG. 8, and controls the "talking" and "listening" steps with the respective buffers.

Figure 11A:
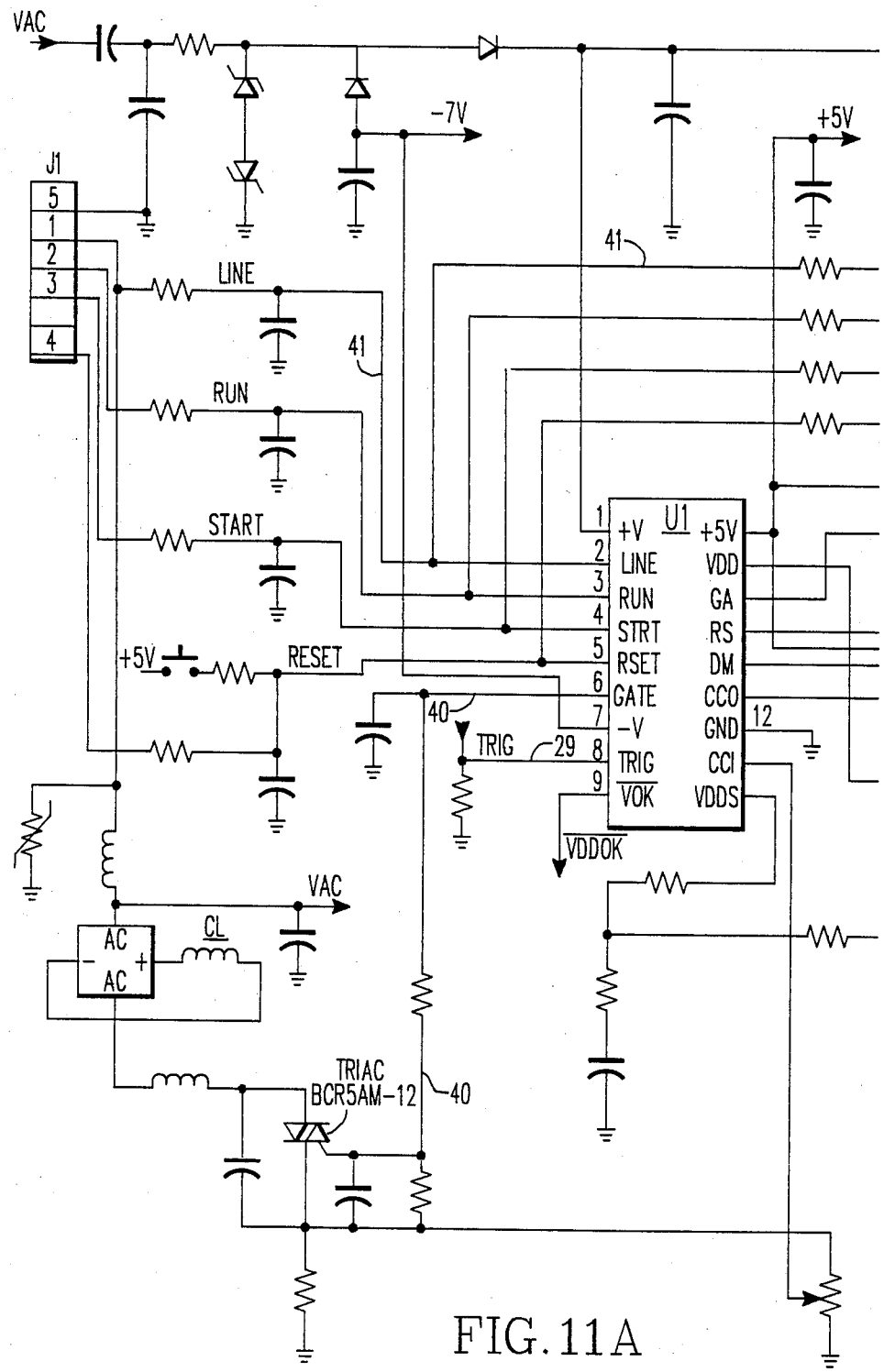
FIGS. 11A–11C show the coil control circuitry and the microcomputer used in the protection control circuit associated with one contactor, and as adapted for performing the talking and listening functions between two contactors according to the present invention; the coil control circuitry is actuated upon when tripping for deenergizing the coil of the contactor as disclosed in the third cross-referenced patent application.
Figure 11B:
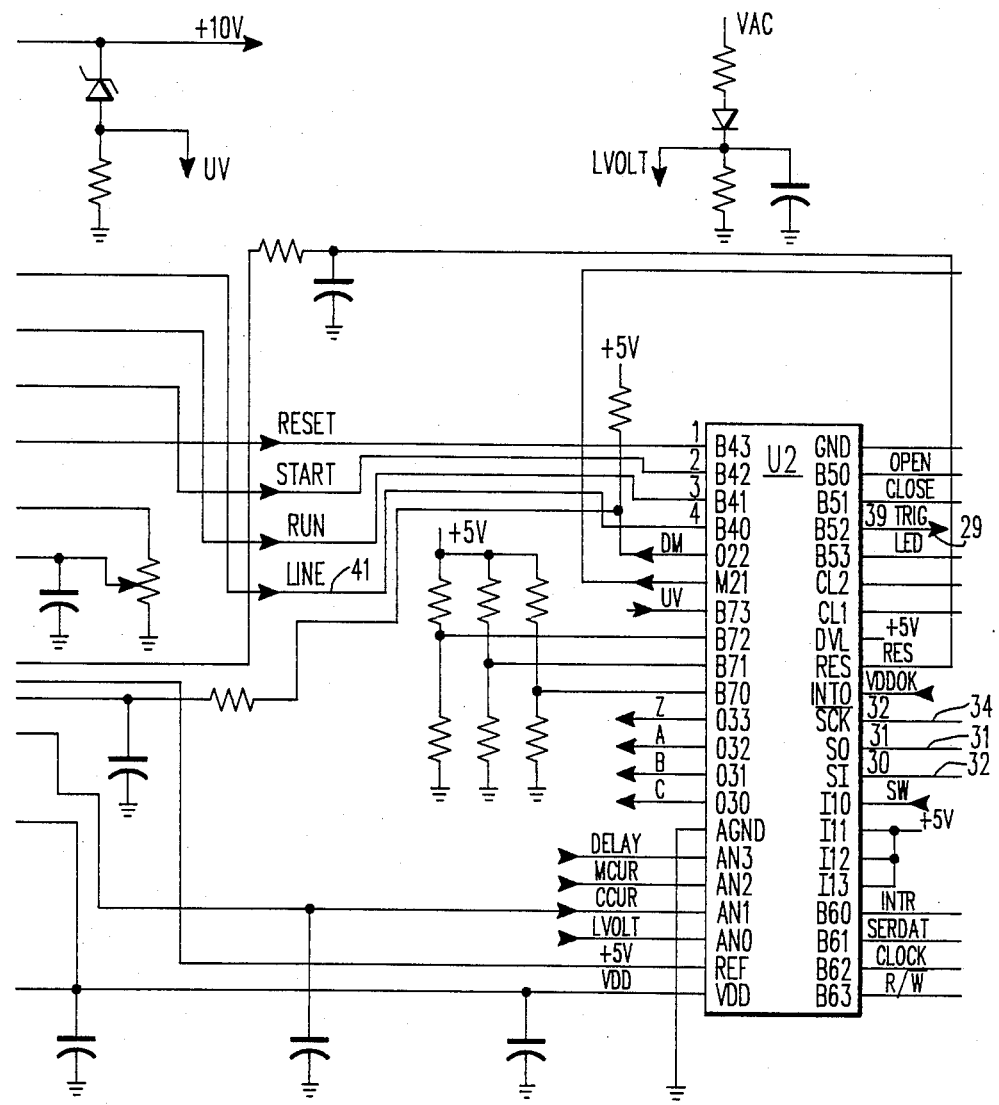
Figure 11C:
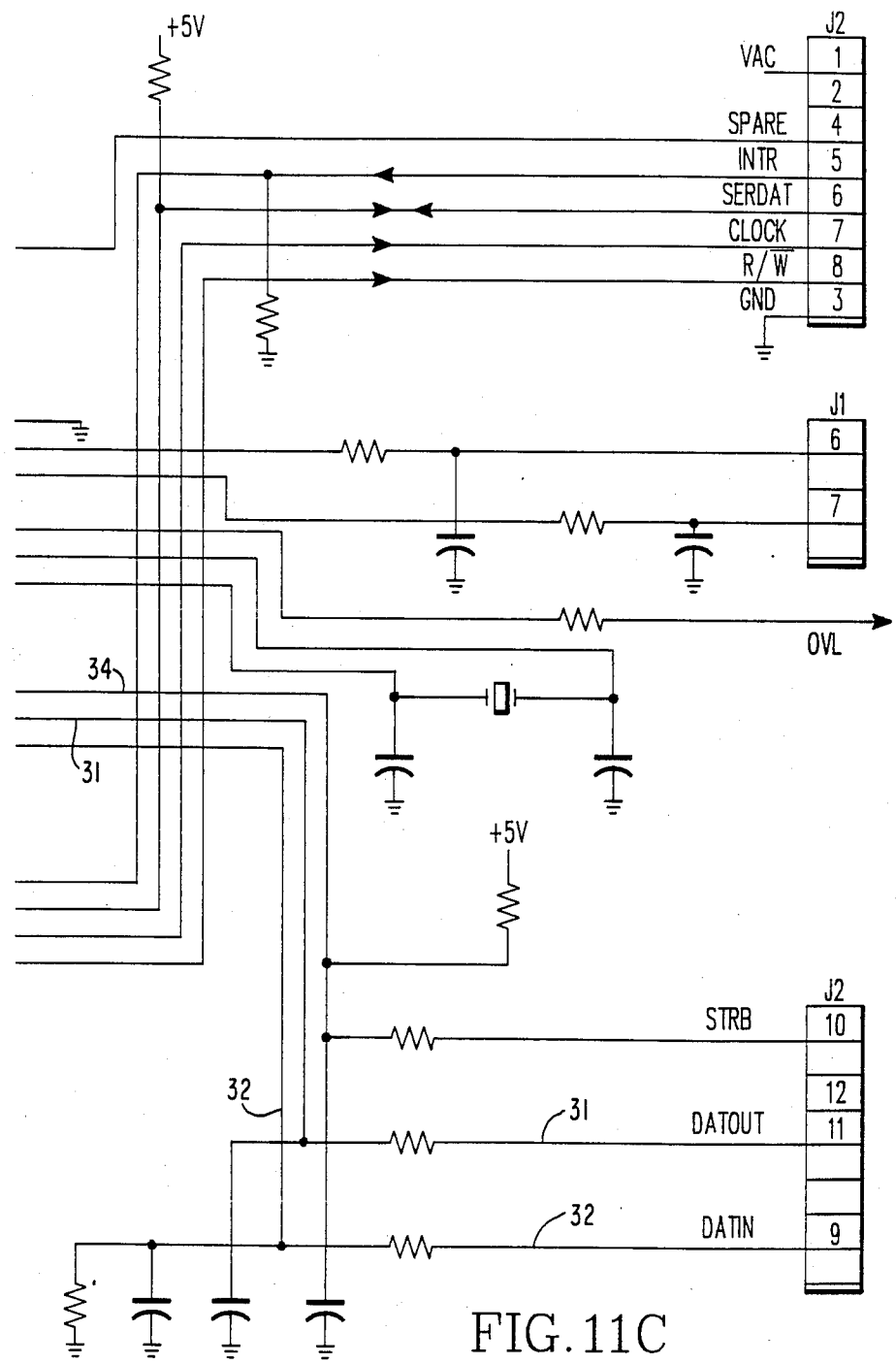

Referring to FIG. 11B, the microprocessor U2 is shown with line 31 from pin 31 outputting "data out" toward the communication BLC and, line 32 to pin 30, inputting "data in" from the communication BLC, when "talking" and "listening", respectively. The serial clock signal (signal $\overline{SCK}$) is also shown on line 34 from pin 32. Pins 1, 2, 3, 4 respectively receive signals RESET, START, RUN, and a LINE signal (characterizing the AC line zero-crossings for synchronization of the microprocessor). Microprocessor U2, typically is a NEC PD7533CU model. FIG. 11A shows the electromagnetic coil CL and the energizing circuit thereof, including a Triac BCR5AM-12 used in relation with an integrated circuit U1, according to the teachings of the third cross-referenced patent application. A TRIG command appears on line 29 of FIG. 11A, generated as an output on pin 39 of microprocessor U2. Line 29, then goes to pin 8 of the integrated circuit U1 (FIG. 11A) so that, from pin 6 thereof, gating of the triac by line 40 may be effected so as to cause the energization of coil CL. Tripping is effected by terminating the trigger pulses of line 2A thereby energizing coil CL. For the purpose of describing the operation of the coil control circuitry, the third cross-referenced patent application is hereby incorporated by reference.

Figure 12:
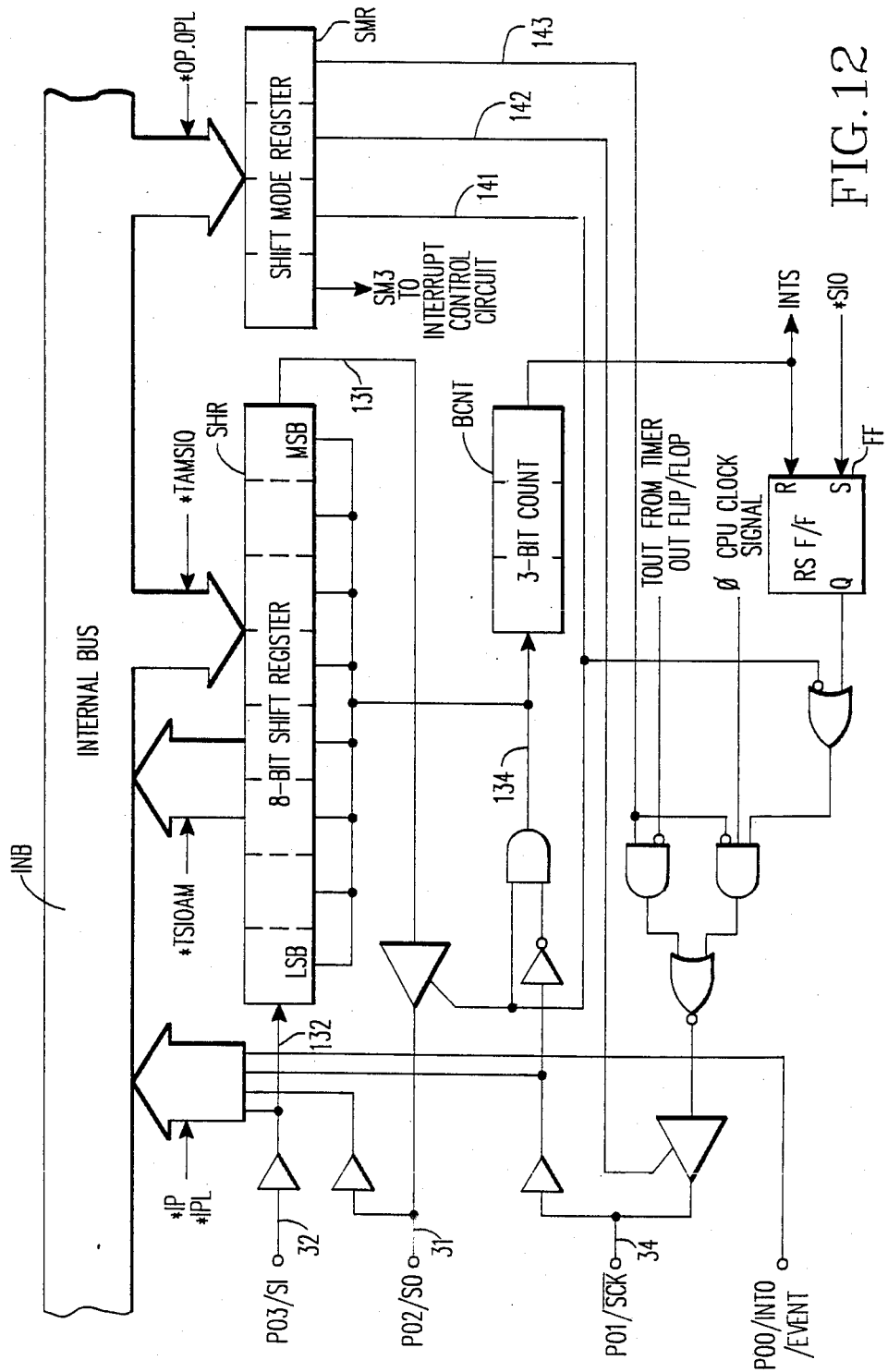
FIG. 12 illustrates serial communications circuitry which is part of the microcomputer as can be used for bidirectional communication according to the invention.

FIG. 12 shows as part of the microprocessor U2, communications circuitry used with buffers BFF1 and BFF2 and participating in the "talking" and the "listening" operation according to FIG. 10. It includes an 8-bit shift register into which data from the "data-in" line 32 is stored under the clock of strobing line 34, or from which "data-out" is output onto line 31. Data communication with the tally circuit TTL is via the internal bus lines INB.

Figure 13:
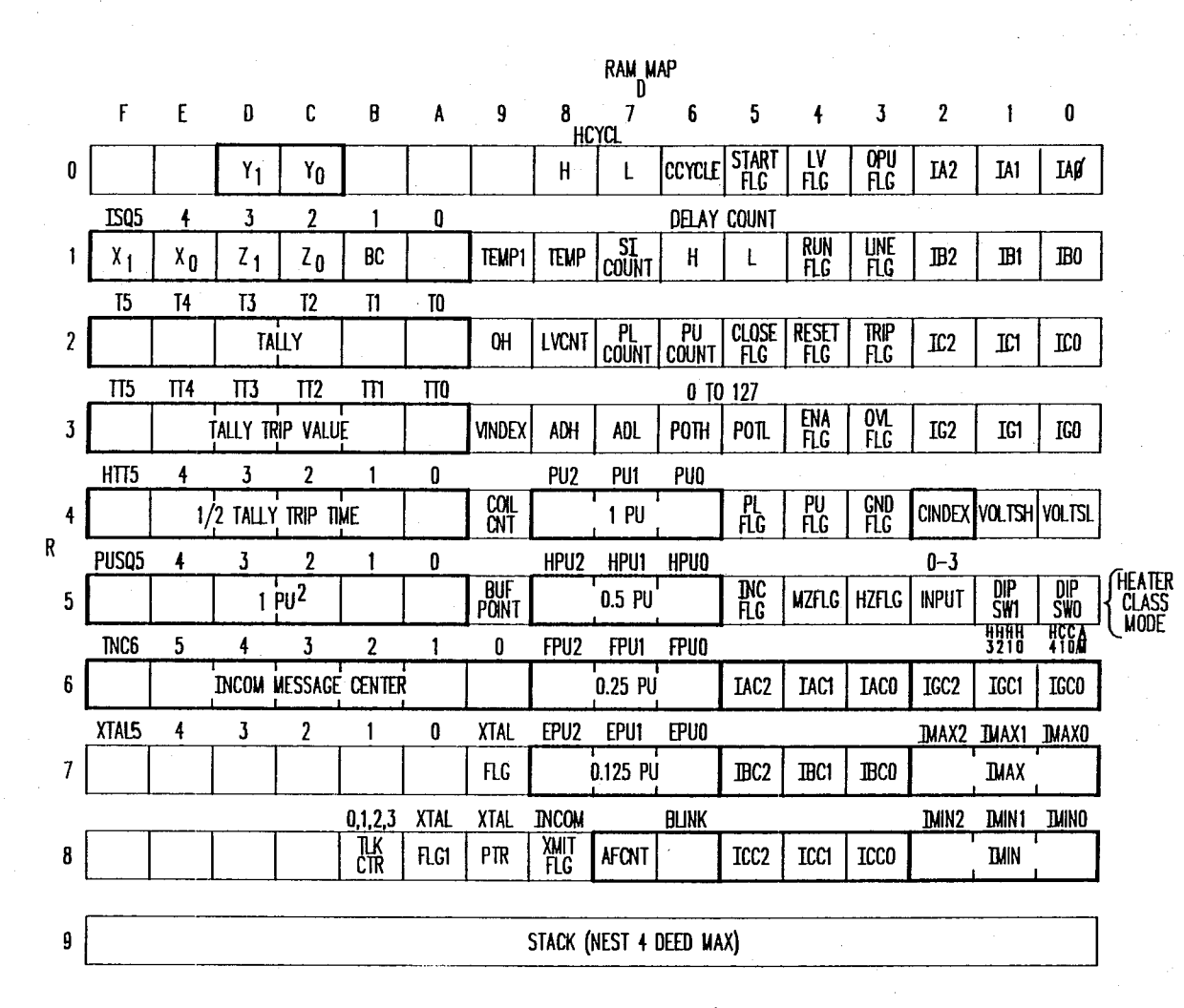
Figure 14:
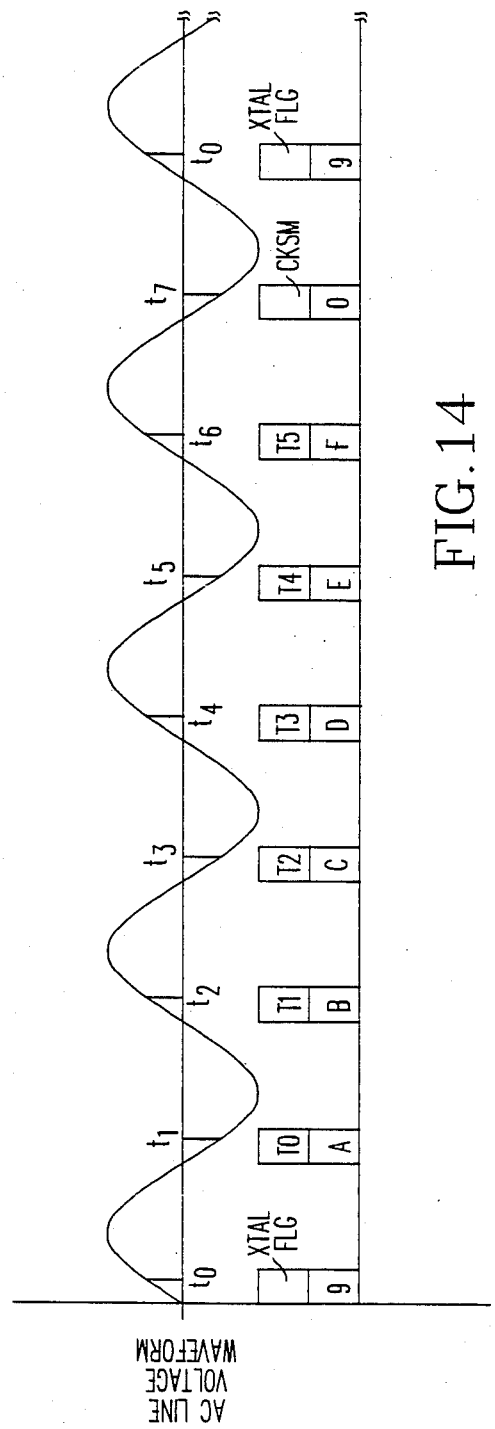
FIG. 14 shows the talking and listening steps in time relation with the zero-crossings of the fundamental waveform.

The operation is better understood from a consideration of FIGS. 13 which represents a RAM map showing internal data organization within the microcomputer, and FIG. 14 which relates elements of data being transferred to the waveform of the AC line. In both instances, the time reference is the zero-crossings of the fundamental AC line waveform shown in FIG. 14. For instance, in the RAM data format shown in FIG. 13, row 0 and columns 8 and 7 indicate the stored data representing at a given time the half-cycle count (HCYCL). When count 33 has been reached, the time interval T has expired. L indicates the least significant 4-bit nibble, whereas H indicates the most significant 4-bit nibble of an 8-bit byte.

Columns 0, 1, 2 and rows 0, 1, 2, 3 show the location of stored data representing the values of the individual Phase currents (A, B, and C) and Ground currents as sensed and derived from transducer TDR. Also in row 0 are flags for START input recognition (column 5), Low Voltage Detect LV (column 4), Overload Pickup OPU (column 3); in row 1 for RUN ENABLE (column 4) and LINE (column 3); in row 2 for the coil control unit status CLOSE (column 5), RESET Input Recognition (column 4) and TRIP (column 3).

The squaring operation conducted in block SQR of FIG. 10, utilizes locations YO, Y1 (row 0 and columns C and D) and BC, ZO, Z1, XO, X1 (row 1 and columns B through F). The tally operation (TTL1) effectuates storing of the sum of the squares in row 2, columns A through F, immediately below. This digital number represents the thermal condition of the motor. The tally and half-tally trip values occupy rows 3 and 4 as shown. In row 4 the three nibbles of columns 6, 7 and 8 hold the 1PU value ($I_{REF}$ of line 22 in FIG. 10). From the reference value 1PU is derived the value $1PU^2$ which, when decremented from the tally corresponds to motor cooling, and when incremented corresponds to motor warming up. As long as values of phase current are below the 1PU pickup level, the $1PU^2$ value (row 5) is added to, or subtracted from, the tally (row 2) until the tally approaches and acquires the ½ trip value (row 4).

Row 7, columns A through F, represents the buffer location BFF1 of FIG. 10 for the tally in which is stored a snapshot of the tally of row 2, columns A–F above as taken therefrom in the "talking" mode and, in the "listening" mode, received through the communication line BCL from the other contactor CNT2.

FIG. 14 shows the transfer of data according to FIG. 13 being synchronized to the zero-crossings of the AC line. Eight bits of data consisting of a 4-bit column address and 4 bits of data is transferred upon each half-cycle.

Thus, it will take 8 half-cycles of the AC waveform to complete the transmission of six nibbles representing the TALLY, plus a seventh nibble representing the status of the TRIP Flag, and an eighth checksum nibble.

When the motor is in one mode, the corresponding contactor is closed, and the associated thermal protection unit of such "active" side is "talking" to the "inactive" side, the thermal protection unit thereof being "listening". A talker continuously transmits the data as shown in FIG. 13. It calculates the 4-bit checksum prior to transmission (at t7 in FIG. 14). After the transmission of the checksum, the talker will renew its snapshot of the tally (row 2, columns A–F) and pass it to corresponding locations in row 7, columns A–F. It will also copy the Trip Flag from row 2, column 5, into XTALFLG (row 7, column 9). At the inactive side, the listener upon reception of an 8-bit message, deposits the 4 bits of data in the column identified by the 4-bit column address of row 7 just mentioned. Upon receiving a byte with a "0" identifier (at t7 in FIG. 14), the listener verifies the checksum and, if valid, transfers the contents of row 7, columns A–F to row 2 columns A–F.

There are two situations to consider. One is when the user has deactivated both contactors, and the motor is stopped. In such case, both thermal function units become "listeners". The thermal image is decremented regularly in each unit similarly but independently. The two contactor thermal images will eventually reach the zero level. The second situation is when one contactor has tripped and, as a result, the other contactor is deactivated. In this situation, the "tripped" contactor remains a "talker" (see in this respect the XTL Flag of row 7 and column 9, already mentioned) so that the "listener" be constantly aware of the degree of cooling on the "talker" side. This approach insures parallelism between the thermal images of the two contactors under the leadership of the "tripped" contactor. In either situation, should the motor be commanded to START, the initial thermal image will be as last recorded, unless it is merely zero.

Referring again to FIG. 12, the data-in and data-out lines (32 and 31, respectively) are recognized. The timing by line 34 and 134 indicates the control in shifting information into and out of the register SHR which receives or contains the tally bytes of row 7 from the talker.

Referring to the circuitry of FIGS. 11A and 11B, the control steps mentioned by reference to FIGS. 12, 13 and 14 involve here the timing of FIG. 14 derived from line 41 to the microcomputer U2; data-out when "talking" is passed via line 31 to the communication line BCL; and data-in when listening is received from line BCL via line 32.

Figure 15:
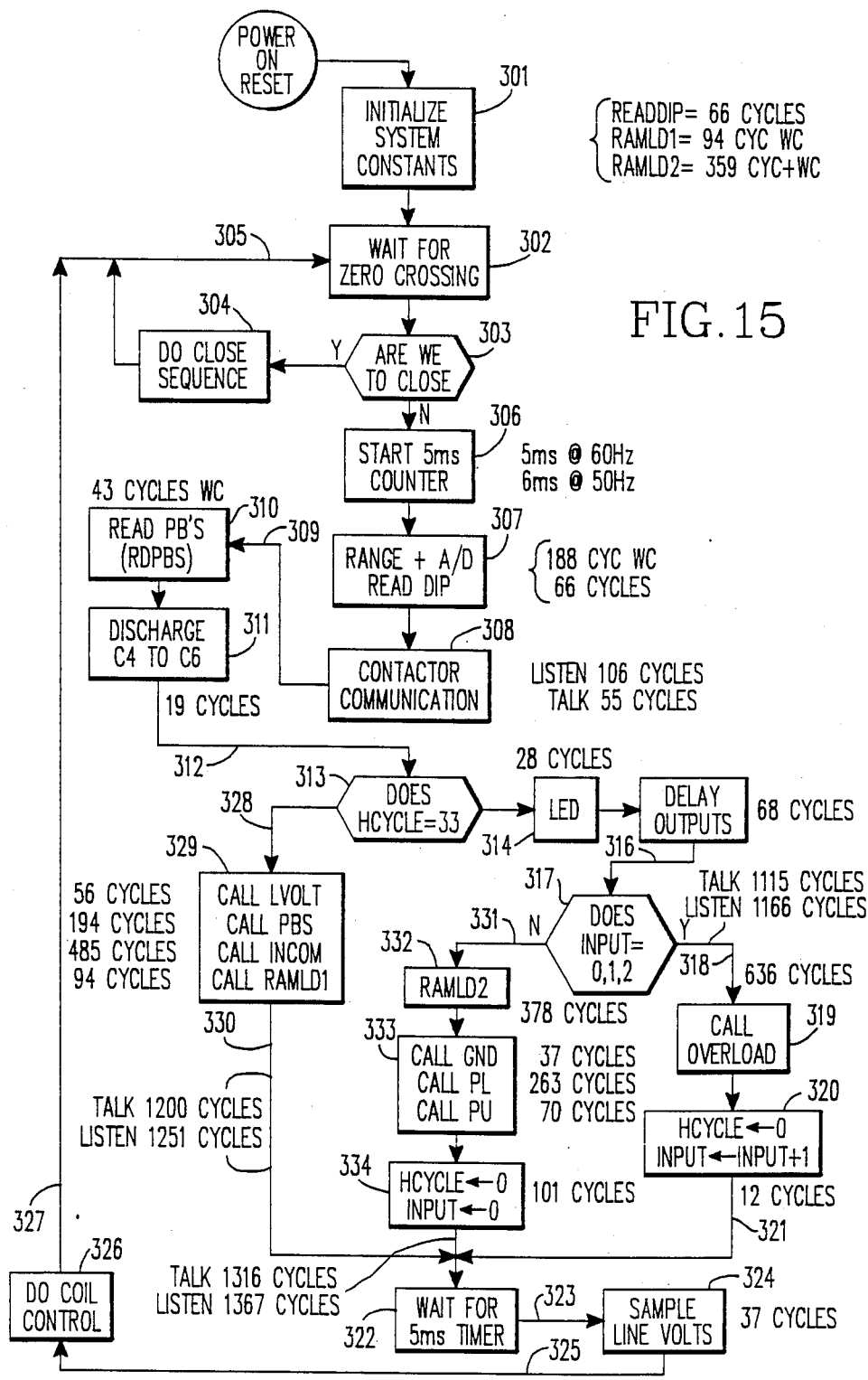
FIG. 15 is a flow chart illustrating the tandem operation of the protection control circuits of FIGS. 2 and 3 and showing the talking and listening steps, as well as the tripping commands, according to the present invention, and their insertion among several other steps required from the microcomputer under overall monitoring and control.

Referring to FIG. 15, a flow chart illustrating how contactor communication between two contactors CNT1 and CNT2, according to the invention, is inserted in the overall operation of the microprocessor, will now be described. At 301 the system is initialized by including the several constants selection. The constants are placed in RAM for later use in the process. Thereafter, at 302 the system waits for the occurrence of an AC line zero crossing. A CLOSE command is accomplished via 304 and line 305; the system returns to the starting point at 302. When closing is completed, at 307 the A/D converter is controlled to derive the value of an AC line current over the course of the successive half-cycles. At 308, as shown in FIG. 14, communications activities take place. It is observed that, assuming the motor is powered under contactor CNT1, the active contactor, and contactor CNT2 becomes the active contactor, the motor reverses its direction. Then, the last complete tally of CNT1 by "talking" will have been stored at the row 2 level in the microprocessor of contactor CNT2, so that it can be used by TTL2 therein for continuous tally of the thermal image of the motor. The same process by "talking" to CNT1, now inactive, will prepare the next mode reversal back to CNT1. When one is "talking", the other is "listening". When the active contactor is called by the associated microprocessor to trip, a flag (row 2 and column 3) will appear and be stored in row 7, column 9 for communication to the idle contactor. Returning to FIG. 15, from line 309 the system performs several bookkeeping steps. At 310 the push-buttons (PBS) inputs are sampled, and at 311 input capacitors C4 to C6 are discharged. By 312 the system goes to 313 where the question is raised whether the HCYCL has become equal to 33, i.e. whether the time interval T is complete. If NO, the line voltage is evaluated, the push-buttons inputs PBS are evaluated, the INCOM data communication and the RAMLDI routines are executed. If YES at 313, the LED routine and DELAY Outputs routines are executed, whereafter at 317 it is ascertained whether the digitized current represents phases A, B, C (inputs 0, 1, 2) or GROUND (input 3). By 331 and 332, at 333 the system executes GND (ground), PL (phase loss) and PU (phase unbalance) protection routines. By 318 at 319 the system executes an Overload Protection routine. At 319 take place steps, shown in FIG. 10, including the squaring of I, the tally accumulation, the comparisons with the ½ tally trip value and with the $1PU^2$ thermal decrement or increment. At 320, HCYCL is reset and another input is selected. The last steps are at 322 to wait for the timer to expire (typically 5 ms) at which time the line voltage is sampled (at 324) and by line 325 the program performs coil current phase control at 326. The routine returns to line 305 and stage 302 by line 327.

We claim:

1. In a thermal protection electromagnetic control system for a bidirectional AC motor drive, including first and second contactors respectively associated with opposite directions of rotation of an AC motor supplied with AC power through said contactors, one contactor being inactive to pass AC power to the motor when the other is active to pass power to the motor; the combination of:

a thermal image generator and a protection control unit being associated with one contactor;

another thermal image generator and another protection control unit being associated with the other contactor;

each thermal image generator being responsive to a signal representative of the AC line current supplied to the motor by the associated contactor for generating a motor thermal status representative signal and the corresponding protection control unit being responsive to said status representative signal and to a limit signal for tripping the associated contactor when said limit signal is exceeded by said status representative signal; and bidirectional communication line means interconnecting opposite protection control units for transferring the status representative signal derived from the thermal image generator of one contactor at one end to the thermal image generator of the other contactor at the other end;

the protection control unit of an active contactor being responsive to the motor thermal status representative signal of the last active contactor and to the thermal status representative signal of the last inactive contactor upon a reversal of direction of the motor.

2. The system of claim 1 with said thermal image generators each calculating the sum of $I^2$ accumulated during the time that the associated contactor is active; the accumulated value of such sum transferred through said bidirectional communication line means from the other end thereof being adopted initially as said sum; whereby an up to date thermal image of the motor is made available to the associated protection control unit throughout the successive motor direction reversals.

3. The system of claim 2 wherein both contactors are deactivated by the respective protection control units when one contactor is deactivated in response to said limit being exceeded by the motor thermal status representative signal.

4. The system of claim 3 with said motor thermal status representative signal being decremented by a predetermined amount by both of said thermal unit generators when one contactor has been deactivated in response to said limit being exceeded; said bidirectional communication line means establishing an up to date representative signal for both protection control units.

5. The system of claim 4 with said thermal generators being enabled when the AC current line exceeds an overload current reference.

6. The system of claim 5 with a predetermined normal thermal image level being established; the motor status representative signal for both thermal image generators being brought up to said normal thermal image level when below said level and the contactors are alternately active, and brought down to said normal thermal image level when above and the AC current line is below said overload current reference.

7. The system of claim 6 with both of said thermal generators being independently operative at each end of said bidirectional communication line means when the motor has been stopped by deactivating both contactors.

* * * * *